United States Patent Office 2,717,751
Patented Sept. 13, 1955

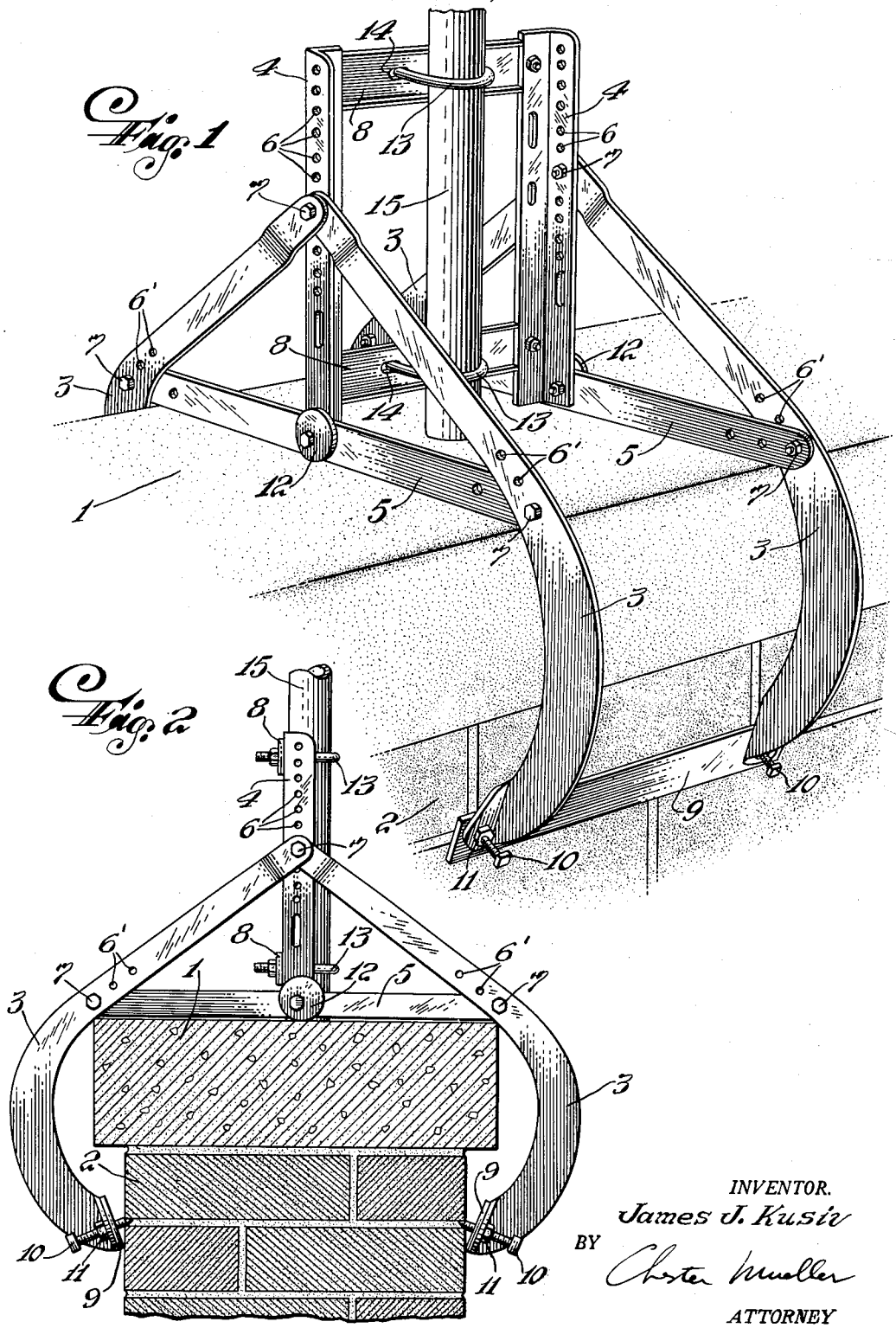

2,717,751

PARAPET MOUNT

James J. Kusiv, Newark, N. J., assignor to Colfax Associates, Kenilworth, N. J., a partnership Application February 7, 1952, Serial No. 270,431

9 Claims. (Cl. 248—43)

This invention relates to mast or pole supports and particularly to improvements in antenna mounting structures, commonly known as parapet mounts.

One object of this invention is to provide means for mounting television antenna or the like on top of walls and roof parapets in a manner to avoid the difficulties which have been encountered in the past.

A further object is to permit such mounting means to be secured to a wall or parapet without the necessity for drilling holes in such wall, parapet or adjacent roof.

Another object is to provide arrangements such as those referred to above which are easily installed and which are extremely sturdy and yet light in weight and adaptable to various conditions that are encountered.

Still another object is to permit the parts of such a support to be readily and economically fabricated, conveniently shipped and easily assembled and mounted. A further object is to enable the supported mast or pole to be firmly fixed in a truly vertical position.

Other objects will appear in the description which follows.

In the drawings in which the same number refers to the same or a similar part:

Figure 1 is a perspective of one embodiment of the invention, assembled and mounted and supporting a pole.

Figure 2 is a side view of the mount of Figure 1 just prior to locking into final position.

The embodiment of the invention shown in the figures illustrates a mount secured in position astride a coping capped parapet wall 2 and supporting a mast 15, only the lower portion of which is shown. In the illustration a brick wall is shown although this mount is equally useful on walls of any construction. It is also of equal value on walls that are not provided with a coping.

Two pairs of claws or clamps 3 straddle coping 1 and at their lower turned out extremities bear against cross bars 9 and the faces of wall 2. The upper ends of clamps 3 are joined to vertical posts 4 by bolts 7. The series of holes 6 in vertical post 4 permit any pair of such holes to be selected for joining the clamp ends thus making the mount adaptable for a wide range of wall thicknesses and coping contours.

Tie bars 5 are bolted at their ends to clamps 3 by bolts 7 and at their centers to the bases of vertical posts 4. Multiple holes 6' in the sections of the clamps adjacent the ends of tie bars 5, and holes in the ends of the tie bars also furnish adjustment to meet the usual wall and coping thickness ranges that might be encountered in a mounting job.

Cross bars 9 in cooperation with set screws 10 threaded through holes adjacent their ends hold the ends of clamps 3 on either side of wall 2 in fixed relationship with one another.

A pair of cross members 8 of U-shaped cross section having their flanges notched at their ends are secured to vertical posts 4 with the notched portions bearing thereon. Slots 14 admit U bolts 13 which hold mast 15 and permit its adjustment in fixed vertical position against the flanges of the cross members.

Pointed set screws 10, on which lock nuts 11 are mounted, pass through the upwardly inclined ends of clamps 3, into and through holes in cross bars 9 as best shown in Figure 2. Set screws 10 are so spaced in cross bars 9 that they will be separated by the customary distance between vertical masonry joints thus permitting them to be embedded in a joint instead of defacing a brick of the wall surface.

At the juncture of tie bars 5 and vertical posts 4, eccentric cam 12 is mounted on the joining bolt, so it may be rotated in position and brought to bear on the top surface of coping 1 and locked in place. Cam 12 is mounted on the joining bolt in any conventional manner so that it will rotate with the bolt. It should be noted that even with a contoured or irregular surface, or a stone or tile surface, cam 12 may be brought to bear on it.

The mount is easily assembled at the site of its future location and requires no special skill. Vertical posts 4, cross members 8 and tie bars 5 are assembled first. Clamps 3 are then attached to vertical posts 4 at a height appropriate to the wall and coping widths. Then clamps 3 are opened sufficiently wide to clear the coping 1 and then the mount is placed astride the coping. Next the clamps are closed against the wall 2. The clamps are then bolted to tie bars 5 using holes 6' which permit the clamps to remain closest to wall 2. While this is being done cam 12 must be in "up" position, that is it must clear the top surface of coping 1.

Next the lock nuts 11 are loosened and set screws 10 are uniformly tightened on both sides of wall 2, care being taken to position the mount to bring the set screws in line with the mortar joints if the wall be brick. The mount is checked to insure that it rests on the coping and that the vertical frame is perpendicular with the wall. The set screws 10 are tightened and the lock nuts 11 kept snug. The heads of the set screws are tapped with a hammer so their points are embedded into the wall. This tightening and tapping operation is repeated until the points are at least one-eighth of an inch in the wall when final tightening and locking is accomplished.

Cams 12 are then rotated by turning the bolts on which they are mounted until they firmly engage the coping and then locked in place by turning the nut of each bolt as far as it will go, preventing lateral movement of the mount on the coping. U bolts 13 are installed, the mast 15 inserted so it rests on the coping and U bolts 13 tightened to hold the mast in a vertical position.

The installation will be varied of course to meet the particular conditions found at each location and the adaptability of the mount to meet such conditions is apparent.

Many modifications may be made in the construction of a parapet mount without departing from the scope of this invention, and the description herein given is not intended to limit such scope.

What I claim is:

1. A mount for supporting a mast and adapted for attachment to the top of a wall or a parapet, comprising two clamp members each comprising a pair of inwardly curved legs hinged at one end with their other ends held in adjustable spaced relationship to each other by a tie bar joining both legs; the said clamp members held in fixed parallel arrangement by cross bars each cross bar connecting a leg of one clamp member with a leg of the other; a vertical frame connected to and supported by the said two clamp members and their tie bars; and mast attaching means associated with the vertical frame.

2. A mount for supporting a post or mast and adapted for attachment to the top of a wall or a parapet, comprising a rigid rectangular vertical frame; two pairs of curved clamp members each pair comprising two downwardly extending legs hinged at their upper ends to said frame at right angles thereto and adapted at their lower ends to bear against both vertical faces of a wall below the top surface thereof with a tie bar connecting the said legs and vertical frame in adjustable spaced relationship to each other; and mast attaching means associated with the vertical frame.

3. A mount for supporting a mast and adapted for attachment astride the top of a wall or a parapet, comprising a rigid rectangular vertical frame supported by two parallel clamp members disposed at right angles thereto and extending below the bottom of the vertical frame, each clamp member comprising a pair of legs hinged at their upper ends to the frame and curving downward and inward with their lower ends secured in adjustable spaced relationship with each other by a tie bar connecting them and the vertical frame; mast attaching means associated with such vertical frame; and a pointed set screw passing through the outer extremity of each leg of each clamp member with its pointed end directed inward.

4. A mount for supporting a mast and adapted for attachment astride the top of a wall or a parapet, comprising a rigid vertical rectangular frame supported on each of two sides by a clamp member disposed at right angles thereto and extending below the bottom of the vertical frame, each clamp member comprising a pair of downwardly and inwardly curved legs hinged at their upper ends, with their lower ends held in adjustable spaced relationship with each other by a tie bar joining the legs and the vertical frame; mast attaching means associated with such vertical frame; a cross bar connecting the lower end of a leg of one clamp member with the lower end of the corresponding leg of the other clamp member; and a pointed set screw passing through the lower extremity of each leg of each clamp member with its pointed end directed inward.

5. A mount for supporting a mast and adapted for attachment astride the top of a wall or a parapet, comprising a pair of vertical members each having a plurality of holes in vertical columnar spaced relationship; a pair of cross members secured at the top and bottom respectively of the vertical members to hold the same in rigid rectangular arrangement; a pair of horizontal slots in each cross member; a U bolt in each pair of slots adapted to hold a mast in clamping engagement; a pair of downwardly and inwardly curved legs hinged at their upper ends through one of the holes in the vertical member; a tie bar having a plurality of holes, bolted to the bottom of such vertical member and adjustably secured to each of the legs hinged thereto; a cam mounted on the bolt joining the tie bar and the vertical member and rotatable to project below the bottom edge of the tie bar; and a pointed set screw passing through the lower end of each leg with its pointed end directed inward.

6. A mount for supporting a mast and adapted for attachment astride the top of a wall or a parapet, comprising a pair of vertical members each having a plurality of holes in vertical columnar spaced relationship; a pair of substantially flat cross members secured at the top and bottom respectively of the vertical members to hold the perforated surfaces of the vertical members in rigid spaced parallel arrangement; an upstanding flange formed on each side of such cross member and spaced from each end thereof; a pair of horizontal slots in each cross member; a U bolt in each pair of slots adapted to hold a mast in clamping engagement against the flanges of the cross members; two pairs of downwardly and inwardly curved legs each pair hinged at their upper ends through one of the holes in one of the vertical members; a tie bar having a plurality of holes, bolted to the bottom of such vertical member and adjustably secured to each of the legs hinged thereto; a cam mounted on the bolt joining the tie bar and the vertical member and rotatable to project below the bottom edge of the tie bar; a cross bar joining one pair of legs with the other pair adjacent their lower ends; and a pointed set screw passing through the lower end of each leg with its pointed end directed inward and upward.

7. A mount for supporting a mast and adapted for attachment astride the top of a wall or a parapet, comprising a pair of vertical angle members each having a plurality of holes in vertical columnar spaced relationship in one leg of the angle; a pair of cross members secured at the top and bottom respectively of the vertical members to hold the same in rigid spaced rectangular arrangement with the perforated surfaces of the vertical members parallel to each other; a pair of horizontal slots in each cross member; a U bolt in each pair of slots adapted to hold a mast in clamping engagement; two pairs of downward and inwardly curved legs each pair hinged at their upper ends through one of the holes in one of the vertical angle members; a tie bar having a plurality of holes, bolted at its center to the bottom of a vertical angle member and adjustably secured to each of the legs hinged thereto; a cam mounted on the bolt joining the tie bar and the vertical member and rotatable to project below the bottom edge of the tie bar; a cross bar joining the lower end of the leg of one pair of legs with the nearer leg of the other pair of legs; and a pointed set screw passing through the lower end of each leg and threaded through the cross bar with its pointed end directed inward and upward.

8. In a mast mount having a bifurcated clamping member adapted to straddle the top of a wall and engage both vertical faces thereof, means for preventing displacement of such member, comprising the top surface of the wall; a tie bar connecting the two halves of the clamping member and positioned adjacent the top surface of the wall; and a cam adjustably and centrally mounted on the tie bar and adapted to bear with its cam surface on the top surface of the wall.

9. In a mast mount having a bifurcated clamping member adapted to straddle and contact the top of a wall and engage both vertical faces thereof, means for rigidly securing the member to the wall, comprising in combination with the top and side surfaces of a wall; a pointed set screw directed inward and passing through each of the lower extremities of such member and adapted to bear against the side surfaces of the wall; a tie bar connecting the two halves of the clamping member and positioned adjacent the top surface of the wall, and a cam adjustably and centrally mounted on the tie bar and adapted to bear with its cam surface on the top surface of the wall.

References Cited in the file of this patent

UNITED STATES PATENTS

| 1,409,800 | Turner | Mar. 14, 1922 |
| 1,530,448 | Weiz | Mar. 17, 1925 |
| 2,057,980 | Ringzelli | Oct. 20, 1936 |
| 2,439,062 | Shur | Apr. 6, 1948 |

FOREIGN PATENTS

| 186,819 | Great Britain | Oct. 12, 1922 |
| 339,508 | Germany | July 26, 1921 |

OTHER REFERENCES

Allied Radio Catalogue #127, January 1952.

Television and FM Antennas and Accessories. Published by JFD Mfg. Co., Brooklyn, New York, December 24, 1948.